United States Patent

Werkheiser et al.

(10) Patent No.: US 10,329,941 B2
(45) Date of Patent: Jun. 25, 2019

(54) IMPINGEMENT MANIFOLD

(71) Applicant: United Technologies Corporation, Farmington, CT (US)

(72) Inventors: Michael D. Werkheiser, Petersburg, VA (US); Christopher W. Robak, Manchester, CT (US); Thomas J. Martin, East Hampton, CT (US); Matthew E. Lynch, Canton, CT (US)

(73) Assignee: United Technologies Corporation, Farmington, CT (US)

( * ) Notice: Subject to any disclaimer, the term of this patent is extended or adjusted under 35 U.S.C. 154(b) by 445 days.

(21) Appl. No.: 15/148,336

(22) Filed: May 6, 2016

(65) Prior Publication Data

US 2017/0321568 A1 Nov. 9, 2017

(51) Int. Cl.
| | | |
|---|---|---|
| F02C 3/04 | (2006.01) | |
| F01D 11/24 | (2006.01) | |
| F02C 7/18 | (2006.01) | |
| F01D 11/20 | (2006.01) | |
| F01D 25/12 | (2006.01) | |
| F02C 6/08 | (2006.01) | |

(52) U.S. Cl.
CPC ............. *F01D 11/24* (2013.01); *F01D 11/20* (2013.01); *F01D 25/12* (2013.01); *F02C 3/04* (2013.01); *F02C 6/08* (2013.01); *F02C 7/18* (2013.01); *F05D 2220/32* (2013.01); *F05D 2240/12* (2013.01); *F05D 2240/30* (2013.01); *F05D 2260/201* (2013.01); *F05D 2300/5021* (2013.01); *Y02T 50/676* (2013.01)

(58) Field of Classification Search
CPC .......... F01D 11/24; F01D 11/20; F01D 25/12; F02C 7/18; F02C 6/08; F02C 3/04; Y02T 50/676; F05D 2300/5021; F05D 2220/32; F05D 2240/12; F05D 2240/30; F05D 2260/201

USPC ............................................................ 60/805
See application file for complete search history.

(56) References Cited

U.S. PATENT DOCUMENTS

| | | | | |
|---|---|---|---|---|
| 2,698,711 A | * | 1/1955 | Newcomb | ........... F04D 27/0215 251/61.1 |
| 4,155,681 A | * | 5/1979 | Linko, III | ................. F02C 7/25 415/115 |
| 4,329,114 A | * | 5/1982 | Johnston | ................. F01D 11/24 415/116 |
| 4,642,024 A | | 2/1987 | Weidner | |

(Continued)

FOREIGN PATENT DOCUMENTS

| | | |
|---|---|---|
| EP | 0492865 | 7/1992 |
| EP | 1473518 | 11/2004 |

(Continued)

OTHER PUBLICATIONS

European Search Report for Application No. 17169950.7 dated Oct. 24, 2017.

*Primary Examiner* — J. Todd Newton

(74) *Attorney, Agent, or Firm* — Carlson, Gaskey & Olds, P.C.

(57) ABSTRACT

An impingement manifold includes a fluid inlet passage and a pressurized chamber. The pressurized chamber includes at least one lobe. The at least one lobe includes a flow improving feature configured to minimize vorticity of a flow field within the pressurized chamber, and at least one flow outlet.

19 Claims, 3 Drawing Sheets

(56) References Cited

U.S. PATENT DOCUMENTS

| | | | | |
|---|---|---|---|---|
| 4,642,027 | A * | 2/1987 | Popp | F01D 25/08 165/133 |
| 4,650,395 | A | 3/1987 | Weidner | |
| 5,092,735 | A * | 3/1992 | Katy | F01D 11/08 415/115 |
| 5,100,291 | A * | 3/1992 | Glover | F01D 11/24 165/169 |
| 5,116,199 | A * | 5/1992 | Ciokajlo | F01D 11/24 415/116 |
| 5,281,085 | A * | 1/1994 | Lenahan | F01D 11/24 415/116 |
| 5,399,066 | A * | 3/1995 | Ritchie | F01D 11/24 165/47 |
| 5,407,320 | A * | 4/1995 | Hutchinson | F01D 11/18 415/115 |
| 5,980,201 | A * | 11/1999 | Benoist | F01D 25/14 415/115 |
| 6,089,821 | A * | 7/2000 | Maguire | F01D 11/24 415/115 |
| 6,185,925 | B1 * | 2/2001 | Proctor | F01D 11/24 415/177 |
| 6,224,329 | B1 * | 5/2001 | North | F01D 25/12 415/116 |
| 6,367,240 | B1 * | 4/2002 | Hoyer | F01D 9/06 60/785 |
| 6,487,491 | B1 | 11/2002 | Karpman et al. | |
| 6,896,038 | B2 * | 5/2005 | Arilla | F01D 11/24 165/47 |
| 7,082,770 | B2 | 8/2006 | Martling et al. | |
| 7,309,209 | B2 * | 12/2007 | Amiot | F01D 11/24 415/136 |
| 7,597,537 | B2 * | 10/2009 | Bucaro | F01D 11/24 415/136 |
| 7,819,626 | B2 * | 10/2010 | Lee | F01D 11/20 415/173.2 |
| 8,092,146 | B2 * | 1/2012 | Legare | F01D 11/24 415/1 |
| 8,403,637 | B2 * | 3/2013 | Kirby | F01D 11/24 415/108 |
| 8,439,629 | B2 | 5/2013 | Pietraszkiewicz et al. | |
| 8,439,639 | B2 | 5/2013 | Joe et al. | |
| 8,740,551 | B2 | 6/2014 | Di Paola et al. | |
| 8,769,954 | B2 * | 7/2014 | Fiebig | F02C 7/222 60/734 |
| 9,243,513 | B2 * | 1/2016 | Hussain | F01D 25/02 |
| 9,316,111 | B2 * | 4/2016 | Eleftheriou | F01D 11/20 |
| 9,316,155 | B2 * | 4/2016 | DiCintio | F02C 7/222 |
| 2004/0213664 | A1 * | 10/2004 | Wilusz | F01D 11/24 415/116 |
| 2009/0116956 | A1 | 5/2009 | Cunha et al. | |
| 2010/0223905 | A1 * | 9/2010 | Todorovic | F01D 11/24 60/226.1 |
| 2010/0232947 | A1 * | 9/2010 | Ireland | F01D 5/186 415/177 |
| 2010/0247297 | A1 * | 9/2010 | Legare | F01D 11/24 415/173.1 |
| 2012/0137650 | A1 * | 6/2012 | Hussain | F01D 25/02 60/39.093 |
| 2013/0156541 | A1 * | 6/2013 | Eleftheriou | F01D 11/20 415/1 |
| 2014/0338308 | A1 * | 11/2014 | Moetakef | F01N 13/10 60/273 |
| 2015/0252683 | A1 * | 9/2015 | Hasting | F01D 11/24 60/782 |
| 2017/0114667 | A1 * | 4/2017 | Sabo | F01D 11/24 |
| 2017/0175769 | A1 * | 6/2017 | Sun | F04D 29/584 |
| 2017/0321568 | A1 * | 11/2017 | Werkheiser | F01D 11/24 |

FOREIGN PATENT DOCUMENTS

| | | |
|---|---|---|
| EP | 2226473 | 9/2010 |
| WO | 2014186002 | 11/2014 |

* cited by examiner

IMPINGEMENT MANIFOLD

TECHNICAL FIELD

The present disclosure relates generally to impingement manifolds, and more specifically to gas turbine engine impingement manifolds including specialized flow features.

BACKGROUND

Gas turbine engines include a compressor that compresses air, a combustor that ignites the compressed air and a turbine across which the compressed air is expanded. The expansion of the combustion products drives the turbine to rotate, which in turn drives rotation of the compressor. In some examples a fan is included forward of the compressor section, and driven to rotate by the turbine as well.

In order to ensure maximized efficiency of the gas turbine engine, a clearance between the tips of rotors in the primary flowpath and an inner diameter of the primary flowpath is kept sufficiently small that a minimum amount of air passes between the tip of the rotor and the outer diameter of the flowpath, while still allowing sufficient space that the tip of the rotor does not contact the outer diameter.

SUMMARY OF THE INVENTION

In one exemplary embodiment an impingement manifold includes a fluid inlet passage, a pressurized chamber including at least one lobe, the at least one lobe including a flow improving feature configured to minimize vorticity of a flow field within the pressurized chamber, and at least one flow outlet.

In another exemplary embodiment of the above described impingement manifold the flow improving feature is at least one of an inward protruding dimple and an outward protruding bulge in at least one wall defining the at least one lobe.

In another exemplary embodiment of any of the above described impingement manifolds the at least one flow outlet has a first cross sectional area normal to an expected direction of fluid flow, and the fluid inlet passage has a second cross sectional area normal to an expected direction of fluid flow, and wherein the first cross sectional area is less than the second cross sectional area.

In another exemplary embodiment of any of the above described impingement manifolds the at least one lobe includes a plurality of lobes and each of the lobes in the plurality of lobes includes a pressurized fluid outlet.

In another exemplary embodiment of any of the above described impingement manifolds the plurality of lobes includes four lobes.

In another exemplary embodiment of any of the above described impingement manifolds the plurality of lobes includes three lobes.

In another exemplary embodiment of any of the above described impingement manifolds an interior surface of the manifold is a continuous interior surface.

In another exemplary embodiment of any of the above described impingement manifolds the continuous interior surface is configured to alter a direction of flow through the manifold by an angle within the range of 35-55 degrees.

In another exemplary embodiment of any of the above described impingement manifolds the continuous interior surface is configured to alter a direction of flow through the manifold by an angle of approximately 45 degrees.

In another exemplary embodiment of any of the above described impingement manifolds wherein the manifold is a single piece constructed via one of an additive manufacturing process and a casting process.

In another exemplary embodiment of any of the above described impingement manifolds the manifold is constructed at least partially of joined shaped sheet metal pieces.

In another exemplary embodiment of any of the above described impingement manifolds a ratio of the radius of curvature to a width of the pressurized chamber at the curvature is within the range of 2 to 3 for at least a portion of an interior surface of the pressurized chamber.

An exemplary method for providing a cooling flow to an aircraft component includes passing a cooling flow through a manifold including a pressurized chamber having at least one lobe including a flow improving feature configured to minimize vorticity of a flow field within the pressurized chamber.

In a further example of the above described exemplary method for providing cooling flow to an aircraft component passing the cooling flow through the manifold further comprises turning the fluid flow less than 55 degrees.

In a further example of any of the above described exemplary methods for providing cooling flow to an aircraft component passing the cooling flow through the manifold further comprises turning the fluid flow within the range of 35-55 degrees.

In a further example of any of the above described exemplary methods for providing cooling flow to an aircraft component passing the cooling flow through the manifold, includes directing the cooling flow using a continuous interior surface of the manifold.

In a further example of any of the above described exemplary methods for providing cooling flow to an aircraft component passing the cooling flow through the manifold includes passing the cooling flow through at least one of a plurality of lobes.

In a further example of any of the above described exemplary methods for providing cooling flow to an aircraft component passing the cooling flow through the manifold includes splitting the cooling flow, such that a portion of the cooling flow is passed through each lobe in the plurality of lobes.

In one exemplary embodiment a gas turbine engine includes a compressor section partially defining a primary flowpath, a combustor section fluidly connected to the compressor section and partially defining the primary flowpath, a turbine section fluidly connected to the combustor section and partially defining the primary flowpath, and a fluid manifold including a continuous interior surface.

In another exemplary embodiment of the above described gas turbine engine the fluid manifold is a component of an active clearance control system configured radially outward of at least one of a compressor stage and a turbine stage, and wherein the fluid manifold includes a fluid inlet passage, a pressurized chamber including at least one lobe, the at least one lobe including a flow improving feature configured to minimize vorticity of a flow field within the pressurized chamber, and at least one flow outlet.

These and other features of the present invention can be best understood from the following specification and drawings, the following of which is a brief description.

DETAILED DESCRIPTION OF AN EMBODIMENT

Figure 1:
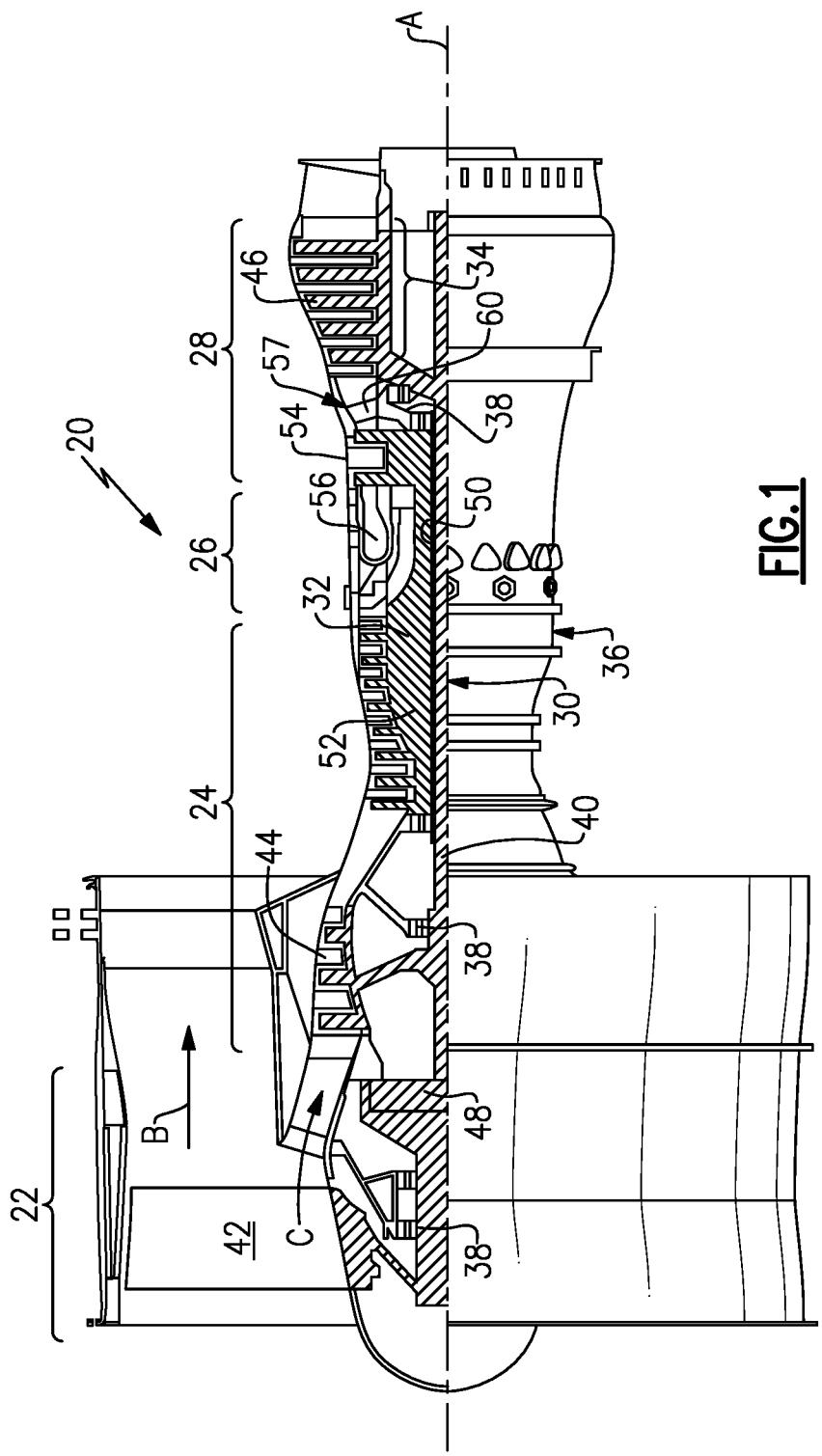
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10668 meters). The flight condition of 0.8 Mach and 35,000 ft (10668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{\wedge}0.5$. The "Low corrected fan tip speed" as disclosed herein according to one non-limiting embodiment is less than about 1150 ft/second (350.5 m/s).

The engine efficiency, fuel consumption, payload, range, and stall margin of gas turbine engines, such as the gas turbine engine 20 illustrated in FIG. 1, is improved by minimizing the amount of leakage of air that occurs within the compressor section 24 and the turbine section 28. Leakage air within the compressor section 24 or the turbine section 28 is air that passes between a radially outward rotor tip and an outer diameter of the primary flowpath. Leakage air does not contribute to the power extracted by the turbine and results in an overall loss of efficiency. The loss of efficiency due to leakage air, which increases as the engine is operated over time, leads to decreased engine service life, less time on wing, greater degradation of engine components, increased maintenance costs, and reduction of exhaust gas temperature margin.

Outer air seals in gas turbine engines form containing shrouds around the rotors. The distance between the case, air seal and the tips of the turbine blades is referred to as the tip clearance. The tip clearance is typically minimized in order to limit the leakage air. However, the tip clearance is maintained large enough to avoid contact between the rotor tips and the shroud. During operation of the gas turbine engine 20, the clearance between blade tips and the surrounding case, or shroud, varies due to thermo-mechanical loads on the rotating and stationary structures. The magnitude of the tip clearance varies over multiple operating points (take-off, climb, cruise, descent, re-accel, etc.) of the engine as distortion and displacement is caused by the centrifugal, thermal and pressure loads on both the rotating and the static components in the engine.

In order to minimize leakage losses during transient engine operation, interstage sealing and blade tip clearance control are used in gas turbine engines. Some gas turbine engines include active clearance control (ACC) systems that improve turbine and compressor blade tip clearances. ACC systems maintain minimum tip clearance during cruise, while avoiding rubs (contact between a blade tip and an outer diameter of the flowpath) over the flight profile. ACC includes active thermal maintenance of one or more aircraft parts.

Some example active thermal maintenance systems utilize cooling air to cool outer air seal segments within a shroud. The cooling of the outer air seal segments results in thermal shrinkage. The thermal shrinkage, in turn, closes the gap between the blades and the shroud by contracting the case. If the clearance is required to be increased, the cooling air is reduced or removed.

Figure 2:
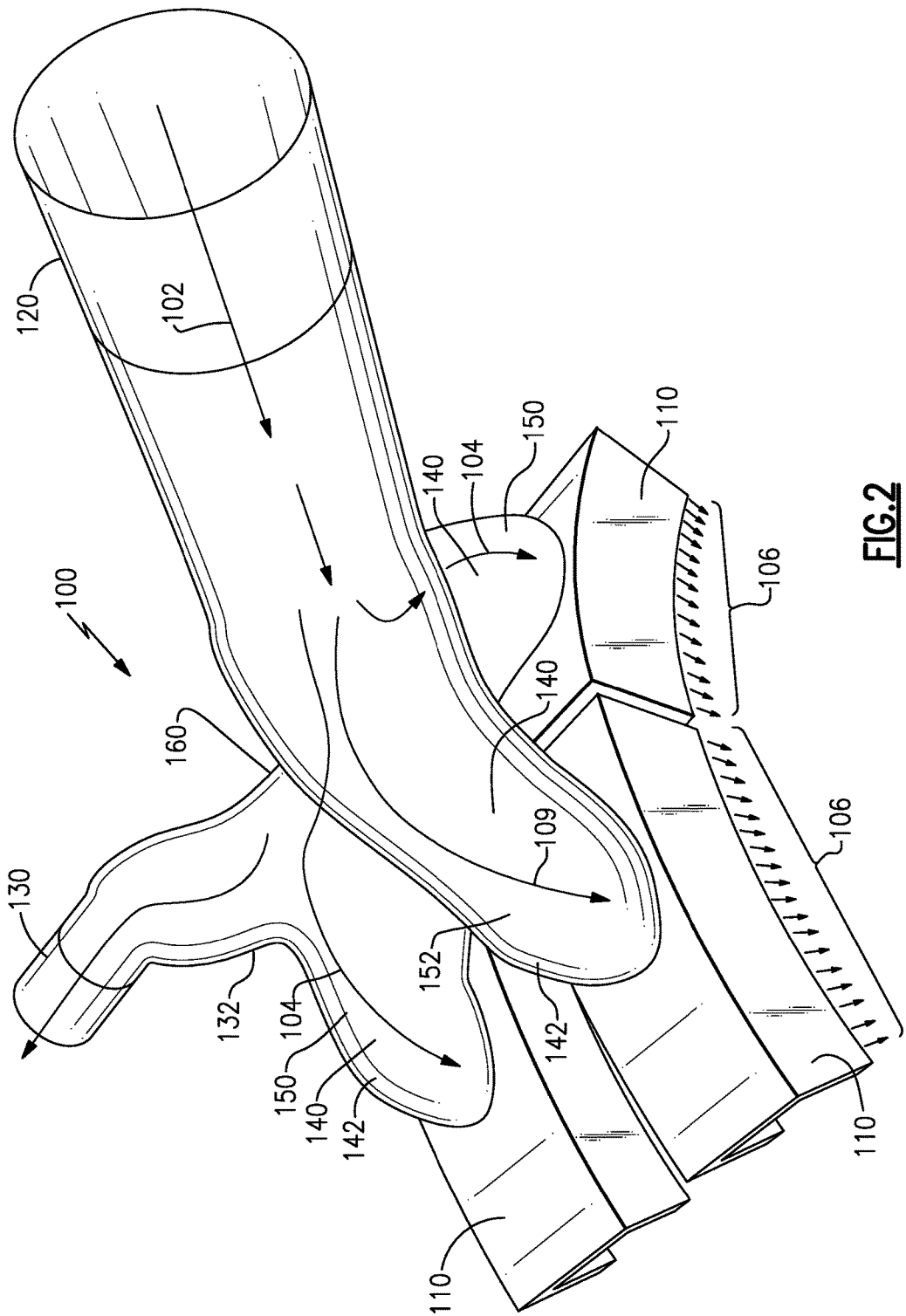
FIG. 2 schematically illustrates an example impingement manifold.
Figure 3:
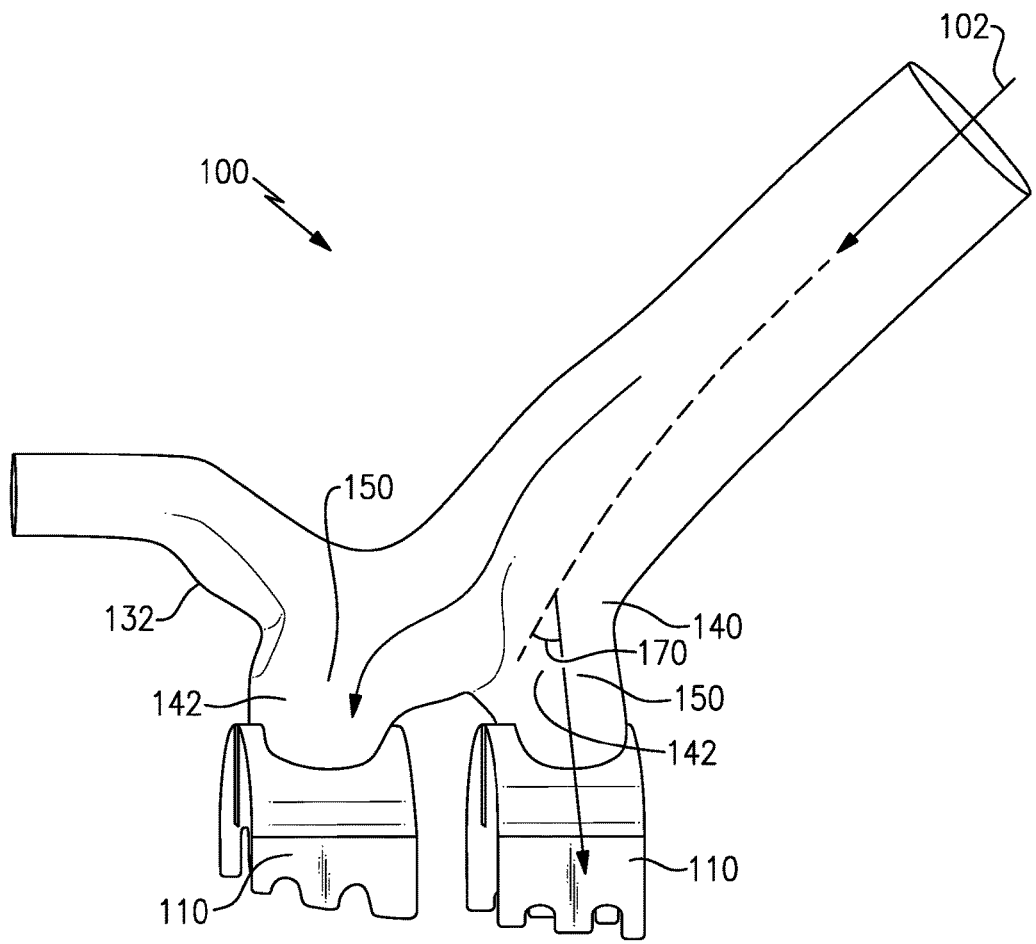
FIG. 3 schematically illustrates an alternate view of the example impingement manifold of FIG. 2.

FIG. 2 schematically illustrates an example impingement manifold 100 that acts as a cooling air collector and air flow splitter to provide cooling air to impingement cavities 110 within a shroud and impinges the cooling air on a blade outer air seal (not pictured, radially inward of the impingement cavity 110. FIG. 3 schematically illustrates an alternate view of the impingement manifold 100 of FIG. 2. The manifold 100 also acts as a controller for the passage of spent impingement air, and facilitates the operation of an ACC system.

The example manifold 100 includes a cylindrical inlet 120 that feeds into a manifold body 160. The manifold body 160 is defined by four lobes 150, each of which is connected to a radially inward impingement cavity 110 by an opening. A cylindrical outlet 130 curves upward from the manifold body 160 and provides an alternative fluid outlet from the manifold body 160. Within each of the lobes 150 is a dimple 140. The dimples 140 are curved inward protrusions into the interior of the lobe 150. Each lobe 150 also includes an outward bulge 142. The bulges 142 are outward protrusions from the interior of the lobe 150. The outlet 130 is connected to the manifold body 160 via a radially outward curvature including a bulge 132. The bulge 132 is similar in form and function to the bulges 142 included on each of the lobes 140. The combination of the dimples 140 and the bulges 142 operates to define a curvature along the interior surface of the manifold body 160 that exerts a total curvature onto flow through the manifold 100 in the range of 35 to 55 degrees. In some examples the curvature is limited to approximately 45 degrees.

The interior surface of the manifold body 160 achieves this curvature via a continuous interior surface. In other words, barring manufacturing roughness, the interior surface includes no angled junctions of 90 degrees or greater. The interior curvature of the manifold is defined as a ratio of the radius of curvature to the width of the manifold 100 at the curvature. In order to achieve the desired bend in the range of 35 to 55 degrees, the ratio of the radius to the width is greater than or equal to 2 and less than or equal to three along the entire interior surface of the manifold 100. In some examples, the ratio within the range of 2 to 3 is localized at each of the lobes 150, dimples 140 and bulges 142. In other examples, the ratio within the range of 2 to 3 is extended across the entire interior surface of the manifold.

In an example implementation, cooling air follows a flow path 102 from the inlet 120 and splits into multiple flows 104 such that the flows 104 are directed radially inward into an impingement cavity 110 of one or more shrouds through a corresponding lobe 150. The impingement cavities 110 in turn generate multiple impingement streams 106 that impinge upon and cool the air seal segments (not pictured). The spent impingement air is then released into the primary flowpath through stator flanges.

The seal segments radially inward of the impingement cavities 110 are in some examples, attached to a thermally efficient internal flow structure that is also cooled inside by air from the fan or compressor. In some examples, the seal segments also purge cooling air through the leading and trailing edges of the shroud segments. Since the pressure in the blade tip clearance region varies axially from the leading to trailing edge, a positive backflow margin in pressure is maintained by an engine controller to achieve this purge flow.

The dimples 140 and bulges 142 described above are included in the forward and leeward walls of each lobe 150 of the manifold 100. The dimples 140 and bulges 142 improve the flow performance of cooling air being provided through the impingement manifold 100 by reducing a vorticity of the cooling air passing through the manifold body 160 relative to a manifold without the dimples 140 and bulges 142. The decreased vorticity improves performance of the ACC system.

Each of the dimples 140 turns the flow 104 entering the corresponding lobe 150 with minimum pressure loss and provides a uniform ejection of the impingement air into the impingement cavities 110. The cooling flow paths 102, 104 branch from the inlet 120 flow path 102 to the lobe flows 104 and the interior surface defined by the lobes 150, dimples 140 and bulges 142 turn the air flows 104 in the forward portion (relative to airflow through the impingement manifold 100) towards the radially inward portion of the forward lobes 104 onto the case.

Flow non-uniformities in the branching region (the area of the manifold body 160 where the lobes 150 branch out) generate recirculation downstream in the lobe flows 104. The dimples 140 impact the direction of the flows 104, by causing the flows 104 to turn less sharply. In some examples the airflow turns are in the range of 35-55 degrees. In alternative examples, the dimples cause the airflow turns to be approximately 45 degree turns. The reduction in the sharpness of the airflow turns is relative to the airflow in a correspondingly shaped manifold that omits the dimples 140, and bulges 142.

The reduced sharpness of the turns results in a fluid velocity field that is locally irrotational. Irrotational flows are idealized flows where losses due to vorticity are minimized. The irrotational flows produced by the dimples 140 and the lobes 150 also reduces a flow path 102 velocity coming from the inlet 120 by pinching the flow towards the lobes 150, resulting in more uniform flow at the outlets connecting the lobes 150 to the impingement cavities 110. The bulge 142 in each lobe 150 sets a compensating or contrary momentum to the radially inward flow. The outlet 130 also includes a bulge 132 as the outlet is turned radially outward. This keeps the flow of the fluid attached and to reduce the velocity in front of the outlet.

In order to construct the bulges 132, 142 and the lobes 150, of the overall manifold 100, as well as to reduce internal features that would induce vortices in the fluid flow through the manifold 100, the manifold 100 is, in some examples, created utilizing an additive manufacturing process. The additive manufacturing process can be any process including direct metal laser sintering (DMLS), or any similar construction technique. While some additive manufacturing systems can create a distinct stair step surface roughness, such a feature is sufficiently small scale that the roughness is not considered to break the continuousness of the interior surface. In alternative examples, particularly those with consecutive series oriented lobes, the manifold 100 can be created using a sheet metal forming procedure such as hydroforming. In yet further alternatives, depending on the specific features of the manifold, the manifold 100 can be constructed utilizing a casting technique.

While discussed above within the specific context of an impingement manifold 100 for an ACC system, one of ordinary skill in the art, having the benefit of this disclosure will understand that the utilization of organic interior curvature, such as dimples and bulges, as well as the lobed construction, can facilitate cooling fluid flow through manifolds for multiple distinct purposes, and is not limited to an ACC impingement manifold.

The curvature defined in the illustrated example includes localized turning within the range of 35-55 degrees or approximately 45 degrees. One of skill in the art, having the benefit of this disclosure will understand that lower curvatures, and in some cases higher curvatures of less than 90 degrees, can achieve similar functions and could be designed in a similar fashion. As such, it is within the contemplation of this disclosure to utilize curvatures outside of the range of 35-55 degrees, and the enumerated ranges are only exemplary in nature. By way of example, a localized turning angle 170 is illustrated in FIG. 3, and is the angle that the fluid flow 102 turns at any given bend. Localized turning can, alternatively, be referred to as altering a direction of flow through the manifold 100.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An impingement manifold comprising:
   a fluid inlet passage;
   a pressurized chamber including at least one lobe, the at least one lobe including at least one of an inward protruding dimple and an outward protruding bulge in at least one wall defining the at least one lobe, the at least one of the inward protruding dimple and the outward protruding bulge being configured to minimize vorticity of a flow field within the pressurized chamber;
   at least one flow outlet; and
   wherein an interior surface of said manifold is a continuous interior surface defining a flowpath turn through the manifold within a range of 35-55 degrees.

2. The impingement manifold of claim 1, wherein the at least one flow outlet has a first cross sectional area normal to an expected direction of fluid flow, and the fluid inlet passage has a second cross sectional area normal to an expected direction of fluid flow, and wherein the first cross sectional area is less than the second cross sectional area.

3. The impingement manifold of claim 1, wherein the at least one lobe includes a plurality of lobes and each of the lobes in the plurality of lobes includes a pressurized fluid outlet.

4. The impingement manifold of claim 3, wherein the plurality of lobes includes four lobes.

5. The impingement manifold of claim 3, wherein the plurality of lobes includes three lobes.

6. The impingement manifold of claim 1, wherein said continuous interior surface defines the flowpath turn through the manifold at an angle of approximately 45 degrees.

7. The impingement manifold of claim 1, wherein the manifold is a single piece constructed via one of an additive manufacturing process and a casting process.

8. The impingement manifold of claim 1, wherein the manifold is constructed at least partially of joined shaped sheet metal pieces.

9. The impingement manifold of claim 1, wherein the at least one lobe includes the inward protruding dimple and defines a locally irrotational fluid velocity field.

10. The impingement manifold of claim 1, wherein the at least one of the inward protruding dimple and the outward protruding bulge includes both of the inward protruding dimple and the outward protruding bulge.

11. An impingement manifold comprising:
    a fluid inlet passage and at least one flow outlet;
    a pressurized chamber including at least one lobe, the at least one lobe including at least one of an inward protruding dimple and an outward protruding bulge in at least one wall defining the at least one lobe, the at least one of the inward protruding dimple and the outward protruding bulge being configured to minimize vorticity of a flow field within the pressurized chamber; and
    wherein a ratio of a radius of curvature of the pressurized chamber to a width of the pressurized chamber at the curvature is within a range of 2 to 3 for at least a portion of an interior surface of the pressurized chamber.

12. A method for providing a cooling flow to an aircraft component comprising:
    passing a cooling flow through a manifold including a pressurized chamber having at least one lobe including at least one of an inward protruding dimple and an outward protruding bulge in at least one wall defining the at least one lobe, the at least one of the inward protruding dimple and the outward protruding bulge being minimizing a vorticity of a flow field within the pressurized chamber; and
    wherein a ratio of a radius of curvature of the pressurized chamber to a width of the pressurized chamber at the curvature is within a range of 2 to 3 for at least a portion of an interior surface of the pressurized chamber.

13. The method of claim 12, wherein passing the cooling flow through the manifold, includes directing the cooling flow using a continuous interior surface of the manifold.

14. The method of claim 12, wherein passing the cooling flow through the manifold includes passing the cooling flow through at least one of a plurality of lobes.

15. The method of claim 14, wherein passing the cooling flow through the manifold includes splitting the cooling flow, such that a portion of the cooling flow is passed through each lobe in said plurality of lobes.

16. A method for providing a cooling flow to an aircraft component comprising:
    passing a cooling flow through a manifold including a pressurized chamber having at least one lobe including at least one of an inward protruding dimple and an outward protruding bulge in at least one wall defining the at least one lobe, the at least one of the inward protruding dimple and the outward protruding bulge being minimizing a vorticity of a flow field within the pressurized chamber, wherein passing the cooling flow through the manifold further comprises turning the cooling flow less than 55 degrees; and wherein a ratio of a radius of curvature of the pressurized chamber to a width of the pressurized chamber at the curvature is within a range of 2 to 3 for at least a portion of an interior surface of the pressurized chamber.

17. The method of claim 16, wherein passing the cooling flow through the manifold further comprises turning the cooling flow within a range of 35-55 degrees.

18. A gas turbine engine comprising:
a compressor section partially defining a primary flowpath;
a combustor section fluidly connected to the compressor section and partially defining the primary flowpath;
a turbine section fluidly connected to the combustor section and partially defining the primary flowpath; and
a fluid manifold defining a pressurized chamber and including a continuous interior surface, the fluid manifold defining at least one lobe, the at least one lobe including at least one of an inward protruding dimple and an outward protruding bulge in at least one wall defining the at least one lobe, the at least one of the inward protruding dimple and the outward protruding bulge defining a flow field having a minimized vorticity within the pressurized chamber, wherein a ratio of a radius of curvature of the pressurized chamber to a width of the pressurized chamber at the curvature is within a range of 2 to 3 for at least a portion of an interior surface of the pressurized chamber.

19. The gas turbine engine of claim 18, wherein the fluid manifold is a component of an active clearance control system configured radially outward of at least one of a compressor stage and a turbine stage, and wherein the fluid manifold includes a fluid inlet passage, and at least one flow outlet.

* * * * *